United States Patent
Vecera et al.

(10) Patent No.: US 9,727,643 B2
(45) Date of Patent: Aug. 8, 2017

(54) MANAGING LOADING OF WEB PAGES

(75) Inventors: Martin Vecera, Brno (CZ); Lukas Petrovicky, Most (CZ)

(73) Assignee: Red Hat, Inc., Raleigh, NC (US)

( * ) Notice: Subject to any disclaimer, the term of this patent is extended or adjusted under 35 U.S.C. 154(b) by 593 days.

(21) Appl. No.: 13/307,170

(22) Filed: Nov. 30, 2011

(65) Prior Publication Data

US 2013/0138767 A1 May 30, 2013

(51) Int. Cl.
*G06F 15/16* (2006.01)
*G06F 17/30* (2006.01)
*H04L 29/08* (2006.01)

(52) U.S. Cl.
CPC .... *G06F 17/30861* (2013.01); *G06F 17/3089* (2013.01); *G06F 17/30893* (2013.01); *H04L 67/02* (2013.01); *H04L 67/2838* (2013.01); *H04L 67/2895* (2013.01)

(58) Field of Classification Search
CPC ........... H04L 67/2838; H04L 17/30893; H04L 67/02; H04L 67/2895; G06F 17/30861; G06F 17/3089; G06F 9/50; G06F 9/5005
USPC ................ 709/202–203, 217–219, 225–229
See application file for complete search history.

(56) References Cited

U.S. PATENT DOCUMENTS

| | | | |
|---|---|---|---|
| 6,212,560 B1 * | 4/2001 | Fairchild | 709/226 |
| 8,463,846 B2 * | 6/2013 | Girbal | 709/219 |
| 8,694,609 B2 * | 4/2014 | Knittel | H04L 67/2847 709/219 |
| 8,910,132 B2 * | 12/2014 | Kolesnikov | H04L 67/10 717/140 |
| 9,049,246 B2 * | 6/2015 | Vecera | H04L 67/02 |
| 2005/0182826 A1 * | 8/2005 | Knittel et al. | 709/219 |
| 2005/0193119 A1 * | 9/2005 | Hayes | 709/225 |
| 2008/0147671 A1 * | 6/2008 | Simon | G06F 17/30899 707/999.01 |
| 2008/0228920 A1 * | 9/2008 | Souders et al. | 709/226 |
| 2012/0124215 A1 * | 5/2012 | Deen | H04L 67/02 709/226 |
| 2012/0215834 A1 * | 8/2012 | Chen et al. | 709/203 |
| 2013/0019017 A1 * | 1/2013 | Bandera et al. | 709/226 |
| 2013/0054675 A1 * | 2/2013 | Jenkins et al. | 709/203 |

* cited by examiner

Primary Examiner — Bharat N Barot
(74) Attorney, Agent, or Firm — Lowenstein Sandler LLP

(57) ABSTRACT

A mechanism for managing loading of a web page is disclosed. A method of the invention includes receiving, by a server machine, a client request for a resource bundle having a resource identifier for a plurality of resources associated with a web page, combining the plurality of resources into the resource bundle and sending a response including the resource bundle to a client.

22 Claims, 6 Drawing Sheets

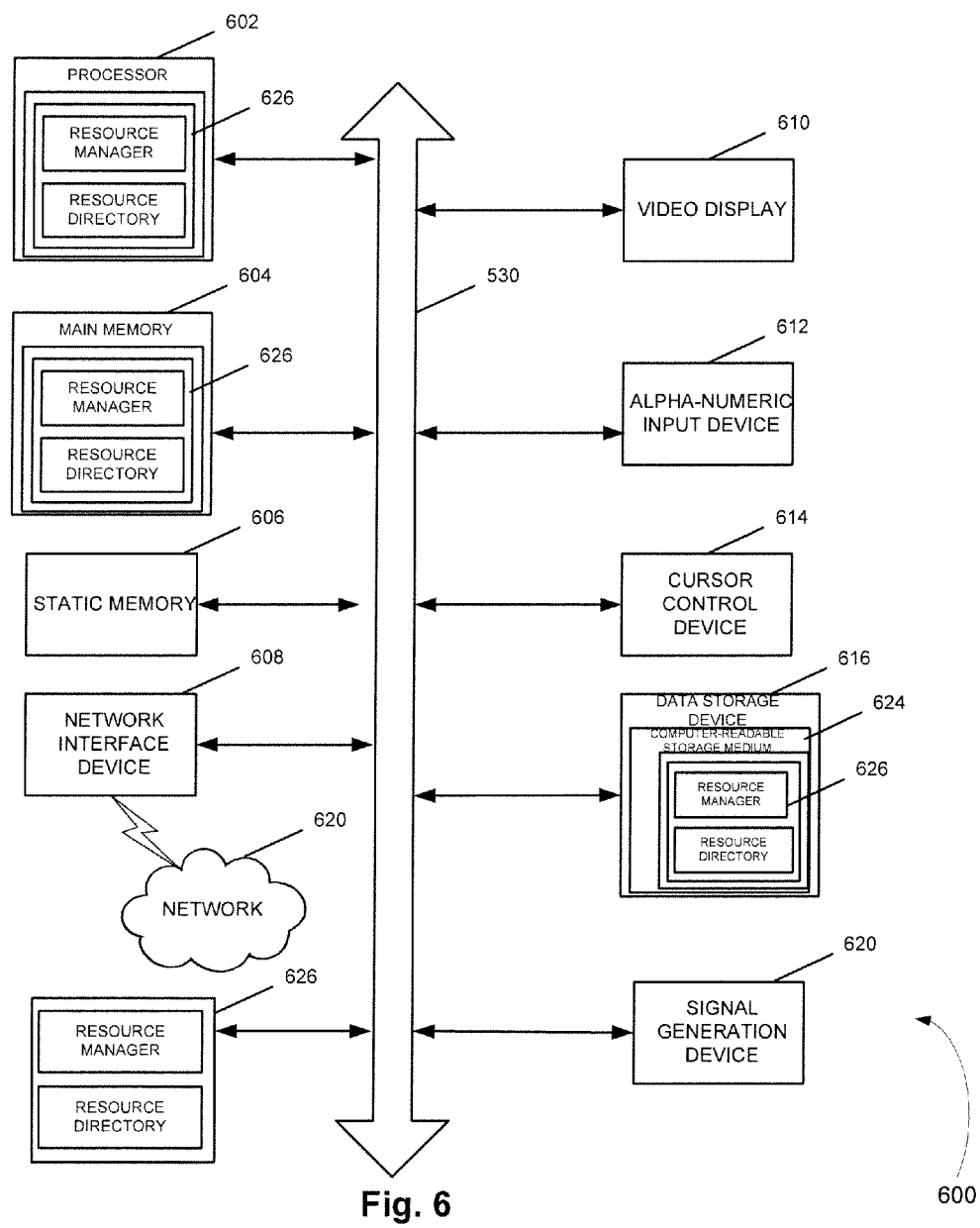

MANAGING LOADING OF WEB PAGES

TECHNICAL FIELD

The embodiments of the invention relate generally to a computer system and, more specifically, relate to systems and methods for managing loading of web pages.

BACKGROUND

A typical web page, also called a web document, consists of a base markup page (base page), for example HTML page, and multiple supporting web resources or objects. Resources can be of different types, such as scripts (e.g. JavaScript), data resources (e.g. XML or other text-based data), style sheets, images and other page components. There are many image formats such as GIF, PNG, and JPEG. Each resource has a web address represented in the form of Uniform Resource Locator (URL). A typical web application operates via Internet, intranet or other computer network that includes multiple interconnected devices located on network nodes (nodes), and has at least one server and client. The server serves web pages in response to client requests, and the client presents them in a web browser.

Management of loading web pages continues to be an important challenge for many web systems such as e-commerce and content sites, Software as a Service (SaaS) and mobile applications, and other web sites and web systems collectively called here "web applications". When browsing on the Internet, users typically expect almost immediate response from the websites. Maintaining adequate response time of a web page remains an important factor impacting web application usability and end-user experience. In web applications, even a few second delay in a web page response may be significant. In web business applications, delay in web page response may lead to loss of users' productivity and even missing some business goals. In e-commerce web sites, delay in web page response creates a less pleasant shopping experience and increases unrealized online purchases. In content web sites, slow web page response causes diminished visitors' loyalty and traffic reduction.

As discussed above, web pages are usually composed of tens or even hundreds of the different resources such as images, style sheets, JavaScript, etc. For each of these resources, a network connection, i.e. request/response, is established between a client and a web server. This connection generally uses transmission control protocol (TCP) to create a reliable path through the network between the client and the web server. Hence, for every request/response from the browser to the server for a resource or a file, a new TCP connection should be established. This operation is expensive for network hardware (e.g. switches and routers) and takes relatively long time. In fact, for files generally small in size, it may take longer to create a connection between the client and the server then to transfer the data and/or metadata in the file. Also, for every TCP connection, there is a Hypertext Transfer Protocol (HTTP) request and response. Thus, in addition to a slow web page response, the connection also requires bandwidth downloading webpage resources as the meta-data ("HTTP headers") needs to be transferred for every file.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

FIG. 6 illustrates a block diagram of one embodiment of a computer system.

DETAILED DESCRIPTION

Figure 1:
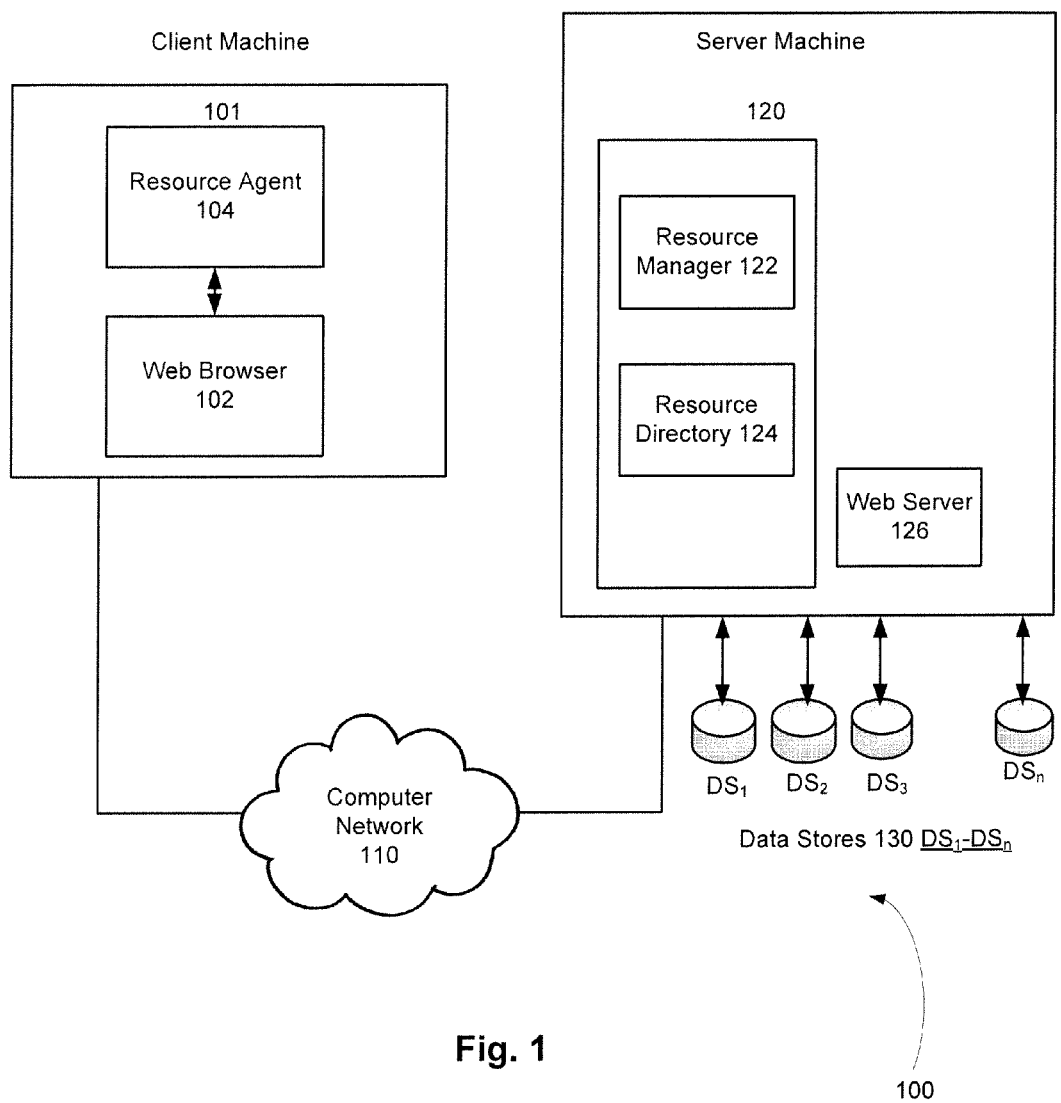
FIG. 1 is a block diagram of a computer system in which the embodiments of the present invention may operate.

Embodiments of the invention provide for systems and methods for managing loading of web page. A method of embodiments of the invention includes receiving, by a server machine, a client request for a resource bundle having a resource identifier for a plurality of resources associated with a web page, combining the plurality of resources into the resource bundle; and sending a response including the resource bundle to a client.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "downloading", "caching", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

Embodiments of the invention provide systems and methods for managing loading of web pages. A resource manager and a resource directory may reside on a server and may receive a request from a client for a resource bundle having web addresses of resources referenced by a base page. The resource manager and the resource directory function to search for the plurality of resources in multiple data stores. The resource manager further combines the plurality of the resources into a resource bundle. A response is sent to the client including the resource bundle. In this manner, only one additional connection and data exchange is made between the client and the server, thus reducing multiple connections and data exchanges between the client and the server resulting in a faster response with full utilization of the bandwidth.

FIG. 1 is a block diagram that illustrates an embodiment of a computer system 100 in which the embodiments of the present application may operate. The system includes a client machine 101, a server machine 120 and a plurality of data stores 130 $DS_1$-$DS_n$. The client machine 101 may be any type of computing device including a laptop computer, a handheld computer, a netbook, a desktop, a workstation or similar computing device. The system can include any number of client devices that communicate over a network 110 with any number of server machines 120. A single client machine 101 is illustrated and described for sake of clarity. The network 110 can be any type of communication network including a local area network (LAN), a wide area network (WAN) (e.g., the Internet) or similar communications network. The communication network 110 can include any number of network devices and computing devices that are in communication over any combination of wired and wireless communication lines.

The client machine 101 executes a set of applications. A 'set,' as used herein refers to any positive whole number of items including a single item. The applications can be any computer executable program capable of communicating the client machine 101 with a web server of the server machine 120. The client 101 hosts a web browser 102 that requests web page content and renders the received web page content on the display of the client 101. The web browser 102 may be coupled to a resource agent 104 (e.g., as a plug-in, a browser module or an independent application) that may request resources (e.g., images, style sheets, JavaScript, etc.) referenced in a requested web page using a single request for a resource bundle.

A server machine 120 can be any type of computing device including a laptop computer, a handheld computer, a netbook, a desktop, a workstation or similar computing device. The system can include any number of server machines 120 that communicate over a network 110 with any number of client machines 101. A single server machine 120 is illustrated and described for sake of clarity.

The server 120 may host a resource manager 122, a resource directory 124 and a web server 126. The web server 126 can transmit web pages to the web browser 102 of the client machine 101 and similarly interact with the resource agent 104 via the web browser 102 to provide content and interactive interfaces to a user of the client machine 101. The resource manager 122 functions to create the resource directory 124 which stores identifiers of resources referenced in web pages provided by the web site of the web server 126. In one embodiment, a tree structure is created in the resource directory 124 such that for every web page a resource identifier is provided to identify the web page and to identify all the resources associated with the web page. Thus, the resource directory 124 consists of tree of directories. The resource manager 122 further functions to manage and update the resource directory 124 as the web content of the website changes (e.g., web pages are added, deleted or modified).

In one embodiment, the resource directory 124 stores identifiers (e.g., URLs, file names, etc.) of various resources and the resources are stored in one or more data stores 130 illustrated as $DS_S$-$DS_n$. The resources can include images, scripts (e.g., JavaScripts, VBscripts, etc.), cascading style sheets (css), and similar resources that are interpreted or executed on the client side by the web browser 102. The resource directory 124 may be an independent data store or part of one or more data stores 130. In another embodiment, the resource manager 122 copies resources from the data stores 130 to the resource directory 124 when the resources directory is created or updated.

The resource manager 122 receives requests for web page content from the client 101 and sends a response back to the client 101. The resource manager 122 further receives a client request for a resource bundle associated with the web page. The resource manager 122 then functions to access the resource directory 124 to identify the resources associated with the web page. The resource manager 122 further utilizes the resource directory 124 to retrieve and combine the resources from the data stores 130 or resource directory 124 into a resource bundle and sends the resource bundle to the web browser 102 of the client machine 101 via the web server 126.

Figure 2:
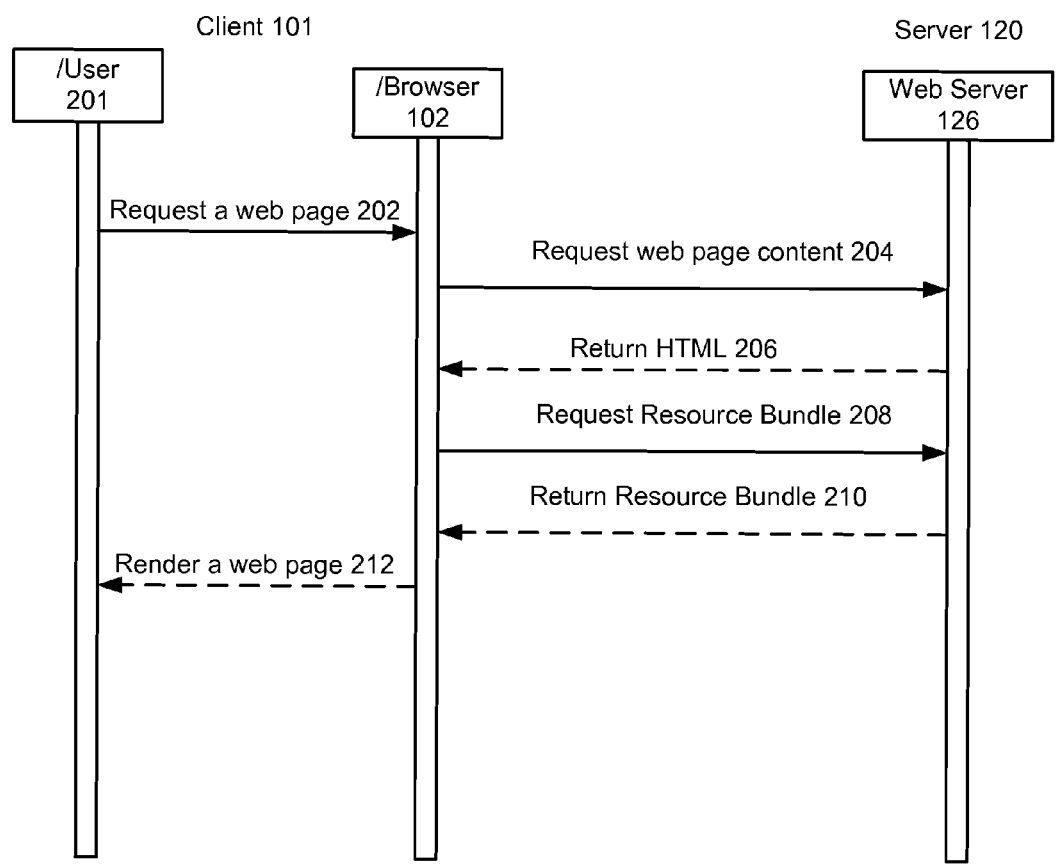
FIG. 2 illustrates an example of interactions between the client and the server in accordance with some embodiments.

FIG. 2 is an example of interactions between the client machine 101 and the server machine 120 via the respective web browsers 102 and 126. As shown, a request for web page (arrow 202) is submitted by a user 201 of the client machine 101 via the web browser 102. The web browser 102 in turn sends the request for web page content (arrow 204) to the server machine 120. The web server 126 returns the response message (arrow 206) using HTML markup. In one embodiment, the response message includes a web page content with a resource identifier which references to resources associated with the web page. The web browser 102 sends the request for a resource bundle (arrow 208) to the web server 126. The resource bundle includes the resource identifier of resources associated with the web page in the web page content. Base page markup, for example HTML, contains reference information, such as URL, sufficient to request such resource bundle. For example, a reference format for the resource bundle request includes

```
<media-pack id="base" src="media.zip"
    url="http://www.acme.com/eshop/" />
```

In the example above, a file named media.zip is requested and files in it will be referenced with the "base" prefix. The "base" prefix identifies resources stored/residing in the resource directory 124. The attribute url indicates that the same media.zip file should be used for all web pages placed in the directory eshop and their subdirectories at the acme.com server. A resource from media.zip may be then referenced in a web page in the following manner:
<img src="media:base:logo.png" />
The above identifies the resource, img src inside the media.zip file (note the "base" identifier) and is named logo.png. It is noted that multiple media packs may be defined to create more fine-grained archives for individual web pages. The web server 126 returns the resource bundle (arrow 210) to the web browser 102. In particular, the web server 126 provides the one or more resources in the resource bundle as requested by the web browser 102. The web browser 102 in turn renders the web page (arrow 212) to the user 201. As illustrated, in the above example of interactions between the client 101 and the server 120, after the web browser 102 requests the web page, it only makes one more HTTP/TCP connection for the resource bundle thus saving additional data exchanges between the web browser 102 and the web server 126 that would otherwise be made to request individual resources. It is noted that the details of these interactions are discussed in more detail below with respect to FIG. 3, FIG. 4 and FIG. 5.

Figure 3:
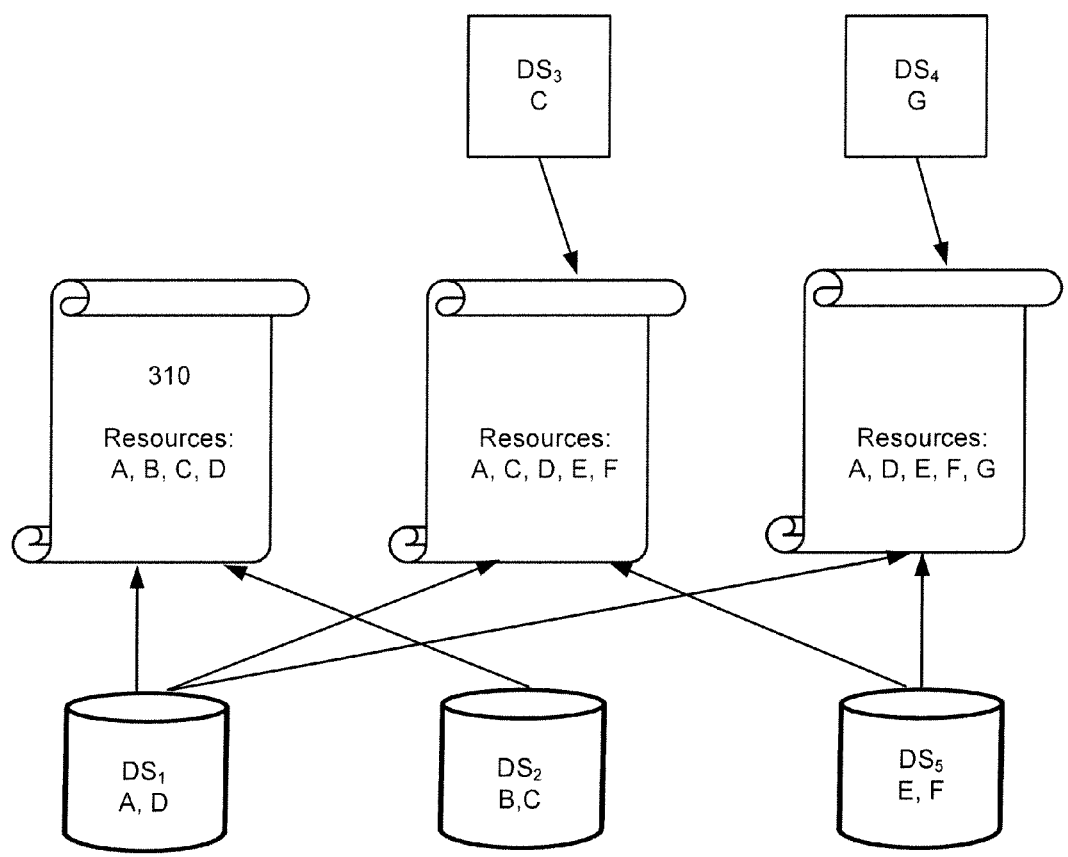
FIG. 3 illustrates an example of storage and retrieval of resources associated with the web pages in accordance with some embodiments.

FIG. 3 illustrates an example of storage and retrieval of resources associated with the web pages in accordance with some embodiments. As illustrated in FIG. 3, resources A and D are stored in $DS_1$ and resources B and C are stored in $DS_2$ Alternatively, the resource C may be stored in an individual separate $DS_3$. Also, as an example, resource G is stored in $DS_4$ and resources E and F are stored in $DS_5$. Even though the first and the second $DS_1$ and $DS_2$ respectively are shown to include only two resources, it is known to one skilled in the art that these resource bundle files may include more than two resources. As an example, the resource bundle request may identify resources A, B, C and D. The resource manager 122 functions to retrieve resources A and D from $DS_1$ and resources B and C from $DS_2$ and combines these resources into a resource bundle 310. The resource manager 122 may function to retrieve and download the resources in either sequential or parallel operation. In this manner, the resource bundle file 310 includes all resources A, B, C and D identified in a resource bundle request of the client.

Figure 4:
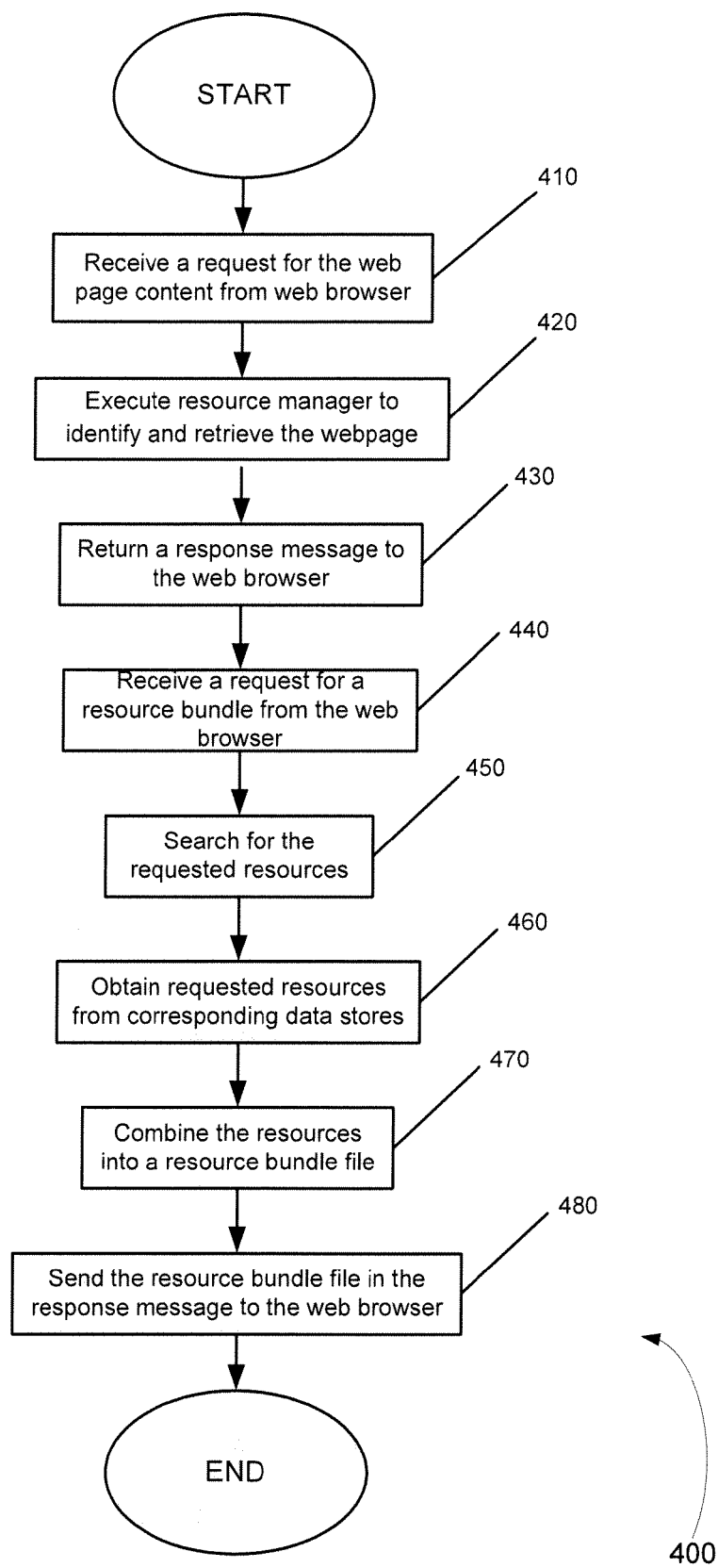
FIG. 4 is a flow diagram of one embodiment of a server-side method for managing web page loading.

FIG. 4 is a flow diagram illustrating a server-side method 400 for managing loading of web pages according to an embodiment of the invention. Method 400 may be performed by processing logic that may comprise hardware (e.g., circuitry, dedicated logic, programmable logic, microcode, etc.), software (such as instructions run on a processing device), firmware, or a combination thereof. In one embodiment, method 400 is performed by the resource management module 124 of FIG. 1.

Method 400 begins at block 410 where a request for the web page content (arrow 204) is received. The server 120 receives the request for the web page content (arrow 204) from the web browser 102 of the client 101. The web browser 102 sends a request message with appropriate request information through the computer network 110 using HTTP protocol. The resource manager 122 is executed at block 420 which functions to identify and retrieve the webpage using the resource directory 124. The web server 126 returns the response message (arrow 206) in Base page markup for example, HTML, back to the web browser 102 at block 430. The response message contains the requested web page content including a resource identifier of resources associated with the web page. As an example, the resource identifier may refer to resources A, B, C and D associated with the web page as illustrated in FIG. 3. The server 120 sends the response message with appropriate requested information through the computer network 110 using HTTP protocol.

At block 440, the server 120 receives a request for resource bundle (arrow 208) from the web browser 102. The resource bundle request may identify resources associated with the web page. For example, the resource bundle request may identify resources A, B, C and D as illustrated in FIG. 3. Upon receipt of the resource bundle request, the resource manager 122 at block 450 functions to search for the requested resources using the resource directory 124. At block 460, the resource manager 122 obtains requested resources from corresponding data stores. For example, as illustrated in FIG. 3, resources A and D may be stored in first $DS_1$ and resources B and C may be stored in $DS_2$. At block 470, the resource manager 122 functions to combine these resources into a resource bundle file. This resource bundle 410 is sent in the response message (arrow 210) to the client machine 101 at block 480. In one embodiment, the resource manager 122 functions to sequentially retrieve each of the multiple resources. In another embodiment, the resource manager 122 functions to retrieve multiple resources in a parallel operation. It is noted that after the web browser 102 requests the resource bundle, only one additional HTTP/TCP connection is made for this resource bundle request using the resource bundle file containing multiple resources. Thus, multiple connections and data exchanges are saved between the web browser 102 of the client machine 101 and the web browser 126 of the server machine 120.

Figure 5:
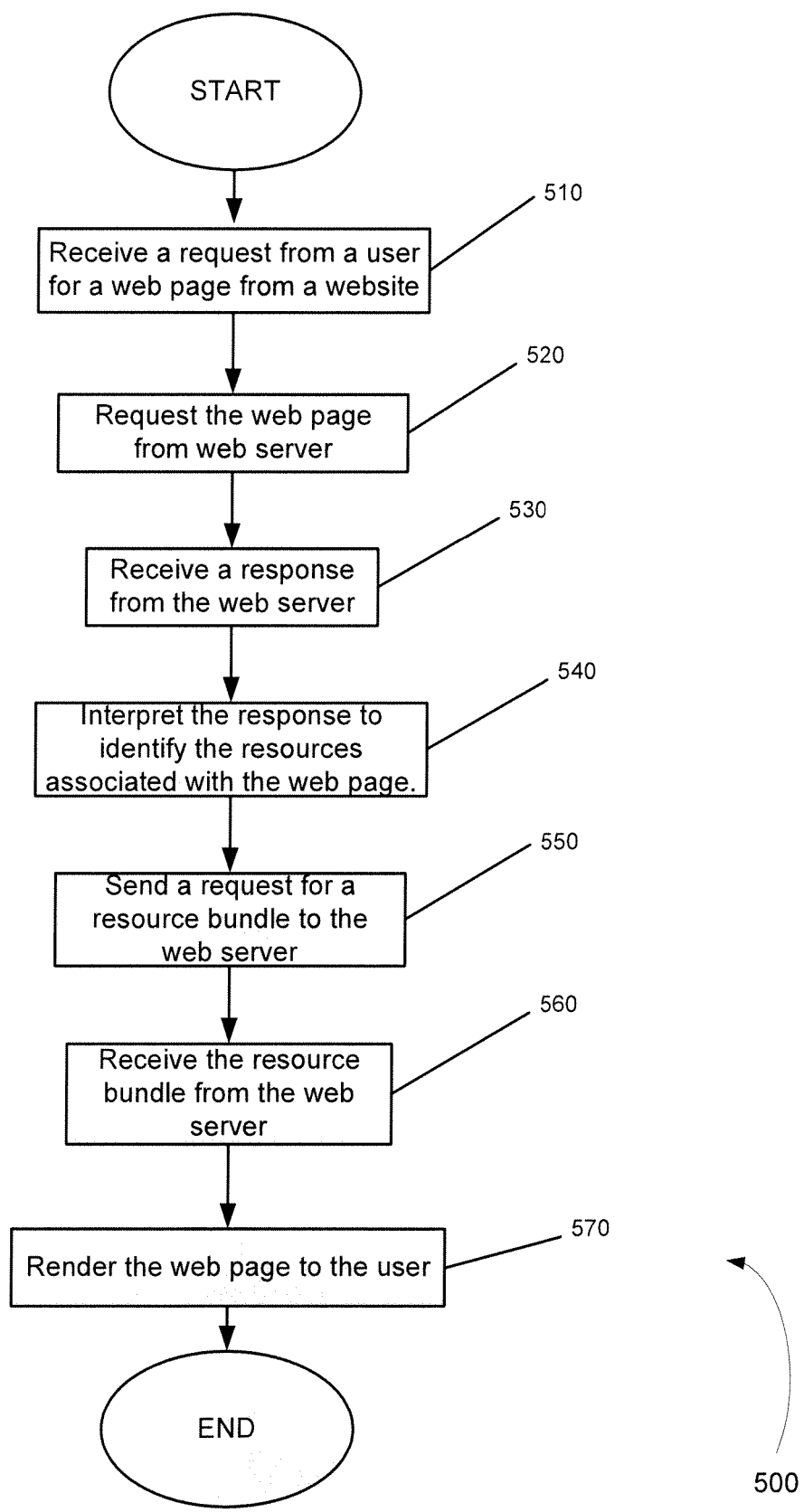
FIG. 5 illustrates a flow diagram of one embodiment of a client-side method for managing web page loading.

FIG. 5 is a flow diagram of a client-side method 500 for managing loading of web pages according to an embodiment of the invention. Method 500 may be performed by processing logic that may comprise hardware (e.g., circuitry, dedicated logic, programmable logic, microcode, etc.), software (such as instructions run on a processing device), firmware, or a combination thereof. In one embodiment, method 500 is performed by a web browser 104 of FIG. 1.

At block 510, the web browser 102 receives a request from a user for a web page (arrow 202) from a website. At block 520, the web browser 102 requests the web page (arrow 204) from the web server 126 of the server machine 120. The web browser 126 receives a response (arrow 206)

from the web server 126 at block 530. As discussed above, the response may contain the requested web page content with a resource identifier for resources associated with the web page. The resource agent 104 of the client machine 101 at block 540 may function to interpret the response to identify the resources associated with the web page. The web browser 102 sends a request for a resource bundle (arrow 208) to the web server at block 550. As discussed above, the request may contain the resource identifier for the resources associated with the web page. The web browser 126 receives the resource bundle (arrow 210) at block 560 and renders the web page (arrow 212) for display on the website to the user at block 570.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing device 602, a main memory 604 (e.g., read-only memory (ROM), flash memory, dynamic random access memory (DRAM) (such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 630.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute resource management logic 626 including the resource manager 122 and the resource directory 124 of FIG. 1 for performing the operations and steps discussed herein.

The computer system 600 may further include a network interface device 508. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 516 (e.g., a speaker).

The data storage device 618 may include a machine-accessible storage medium (or more specifically a computer-readable storage medium) 624 on which is stored one or more sets of instructions (e.g. resource manager or resource directory 626) embodying any one or more of the methodologies of functions described herein (e.g. resource manager 122 or resource directory 124 of FIG. 1). the resources The resource management logic 626 may also reside, completely or at least partially, within the main memory 604 and/or within the processing device 602 during execution thereof by the computer system 600; the main memory 604 and the processing device 602 also constituting machine-accessible storage media.

The machine-readable storage medium 624 may also be used to store the resource management logic 626 persistently. While the machine-accessible storage medium 624 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
   receiving, by a processing device of a server, a first client request for web page content of a web page;
   sending, by the processing device of the server, the web page content and a resource identifier identifying a resource bundle comprising a plurality of resources associated with the web page content in a web page;
   receiving, by the processing device of the server, a second client request for the resource bundle, wherein the second client request comprises the resource identifier of the resource bundle;
   searching for the resource identifier in a resource directory of the server, the resource directory comprising a tree of directories comprising the plurality of resources and resource identifiers of multiple web pages provided by the server;
   combining the plurality of resources into the resource bundle;
   adding the resource bundle to the resource directory of the server, wherein the tree of directories includes a directory for a web domain comprising the web page and a subdirectory for a subdomain of the web domain, and wherein the added resource bundle corresponds to the web page of the directory and to a plurality of web pages of the subdirectory; and sending a response comprising the resource bundle to a client.

2. The method of claim 1 wherein the combining comprises retrieving the plurality of resources from a data store in a sequential operation.

3. The method of claim 1 wherein the combining comprises retrieving the plurality of resources from a data store in a parallel operation.

4. The method of claim 1, wherein the plurality of resources comprise at least one of images, stylesheets or javascript files.

5. The method of claim 1 wherein the resource identifier is a tag or a link.

6. The method of claim 1 further comprising updating the resource directory to delete the resource bundle from the server in response to the web page being deleted.

7. A method comprising:

transmitting, by a processing device of a client, a first request for a web page comprising web page content;

receiving, by the processing device of the client, the web page content and a resource identifier provided by a server, wherein the resource identifier identifies a resource bundle comprising a plurality of resources associated with the web page content of the web page;

sending, by the processing device of the client, a second request for the resource bundle to the server that provided the web page content, wherein the second request comprises the resource identifier of the resource bundle; and receiving, by the processing device of the client, the resource bundle from the server that provided the web page content, wherein the resource bundle is generated in view of a resource directory comprising a tree of directories that includes a directory for a web domain comprising the web page and a subdirectory for a subdomain, and wherein the resource bundle corresponds to the web page of the directory and to multiple web pages of the subdirectory.

8. The method of claim 7 further comprising interpreting the web page content to identify the plurality of resources associated with the web page.

9. A server computer system, comprising:

a memory;

a processing device, operatively coupled to the memory, to:

receive a first client request for a web page content of a web page;

send the web page content and a resource identifier identifying a resource bundle comprising a plurality of resources associated with the web page content of the web page;

receive a second client request for the resource bundle, wherein the second client request comprises the resource identifier of the resource bundle;

search for the resource identifier in a resource directory of the server, the resource directory comprising a tree of directories comprising the plurality of resources and resource identifiers of multiple web pages provided by the server;

combine the plurality of resources into the resource bundle; and add the resource bundle to the resource directory of the server, wherein the tree of directories includes a directory for a web domain comprising the web page and a subdirectory for a subdomain, and wherein the added resource bundle corresponds to the web page of the directory and to a plurality of web pages of the subdirectory; and send a response comprising the resource bundle to a client.

10. The system of claim 9 wherein the processing device to update the resource directory to delete the resource bundle from the server in response to the web page being deleted.

11. The system of claim 9 wherein the processing device to retrieve the plurality of resources from a data store in a sequential operation.

12. The system of claim 9 wherein the processing device to retrieve the plurality of resources from a data store in a parallel operation.

13. The system of claim 9 wherein the plurality of resources comprises at least one of images, stylesheets or javascript files.

14. The system of claim 9 wherein the resource identifier is a tag or a link.

15. A client computer system, comprising:

a memory;

a processing device, operatively coupled to the memory, to:

transmit a first request for a web page comprising web page content;

receive the web page content and a resource identifier provided by a server, wherein the resource identifier identifies a resource bundle;

send a second request for the resource bundle to the server that provided the web page content, wherein the second request comprises the resource identifier for the resource bundle comprising a plurality of resources associated with the web page content; and receive the resource bundle from the server that provided the web page content, wherein the resource bundle is generated in view of a resource directory comprising a tree of directories that includes a directory for a web domain comprising the web page and a subdirectory for a subdomain, and wherein the resource bundle corresponds to the web page of the directory and to multiple web pages of the subdirectory.

16. The system of claim 15 wherein the processing device to interpret the web page content to identify the plurality of resources associated with the web page.

17. A non-transitory machine-readable storage medium comprising data that, when accessed by a processing device of a server, cause the processing device to:

receive, by the processing device, a first client request for web page content of a web page;

send, by the processing device, the web page content and a resource identifier identifying a resource bundle comprising a plurality of resources associated with the web page content of the web page;

receive, by the processing device, a second client request for the resource bundle, wherein the second client request comprises the resource identifier of the resource bundle;

search for the resource identifier in a resource directory of the server, the resource directory comprising a tree of directories comprising the plurality of resources and resource identifiers of multiple web pages provided by the server;

combine the plurality of resources into the resource bundle; and add the resource bundle to the resource directory of the server, wherein the tree of directories includes a directory for a web domain comprising the web page and a subdirectory for a subdomain, and wherein the resource bundle corresponds to the web page of the directory and to a plurality of web pages of the subdirectory; and send, by the processing device of the server, a response comprising the resource bundle to a client.

18. The non-transitory machine-readable storage medium of claim 17 wherein the processing device to:
update the resource directory to delete the resource bundle from the server in response to the web page being deleted.

19. The non-transitory machine-readable storage medium of claim 17, wherein the processing device to:
retrieve the plurality of resources from a data store in a sequential operation.

20. The non-transitory machine-readable storage medium of claim 17, wherein the processing device to:
retrieve the plurality of resources from a data store in a parallel operation.

21. The non-transitory machine-readable storage medium of claim 17 wherein the plurality of resources comprises at least one of images, stylesheets or javascript files.

22. The non-transitory machine-readable storage medium of claim 17 wherein the resource identifier is a tag or a link.

* * * * *